United States Patent [19]

Nishimura et al.

[11] Patent Number: 4,858,953
[45] Date of Patent: Aug. 22, 1989

[54] APPARATUS FOR DRIVING AN INTERMEDIATE PORTION OF WEBBING

[75] Inventors: Yuji Nishimura; Takashi Kawaharazaki; Keiichi Tamura; Kenji Matsui; Yasutaka Watanabe; Noritada Yoshitsugu, all of Aichi, Japan

[73] Assignees: Kabushiki Kaisha Tokai-Rika-Denki-Seisakusho; Toyota Jidosha Kabushiki Kaisha, both of Aichi, Japan

[21] Appl. No.: 24,125

[22] Filed: Mar. 10, 1987

[30] Foreign Application Priority Data

Mar. 11, 1986 [JP] Japan ................................. 61-53260

[51] Int. Cl.⁴ ............................................. B60R 22/34
[52] U.S. Cl. ..................................... 280/807; 180/268; 297/475; 242/107
[58] Field of Search ................................ 280/801–804, 280/807, 808; 297/483, 475, 486; 307/10 R, 10 SB; 242/107; 180/268

[56] References Cited

U.S. PATENT DOCUMENTS

| | | | |
|---|---|---|---|
| 4,573,709 | 3/1986 | Kawai et al. | 280/804 |
| 4,597,587 | 7/1986 | Yoshitsugu et al. | 280/803 |
| 4,616,141 | 10/1986 | Hollowell | 280/801 |
| 4,756,553 | 7/1988 | Haland et al. | 280/804 |

FOREIGN PATENT DOCUMENTS 55-28552  2/1980  Japan .

Primary Examiner—Richard A. Bertsch
Attorney, Agent, or Firm—Sixbey, Friedman, Leedom & Ferguson

[57] ABSTRACT

An apparatus for driving an intermediate portion of a webbing for use in a seatbelt system for restraining an occupant of a vehicle by means of a webbing having one end accommodated in a webbing accommodating device through a biasing force is arranged to withdraw the webbing from the accommodating device in opposition to the biasing force. Accordingly, when an occupant is to apply the webbing to himself by withdrawing it from the accommodating device, the webbing can be withdrawn and applied with a small manual force.

29 Claims, 11 Drawing Sheets

APPARATUS FOR DRIVING AN INTERMEDIATE PORTION OF WEBBING

BACKGROUND OF THE INVENTION

1. Field of the Invention

The present invention relates to an apparatus for driving an intermediate portion of a webbing which allows the intermediate portion of the webbing to be driven in the direction of application of the webbing around an occupant, as necessary.

2. Description of the Related Art

Heretofore, a proposal has been made with respect to an automatic seatbelt system which is capable of automatically applying a webbing around an occupant after he has entered a vehicle.

Such an automatic seatbelt system is arranged such that an end portion of the webbing is guided along a rail laid along a side of a vehicle and, can thereby be moved in the longitudinal direction of the vehicle. If the occupant seats himself, the end portion of the webbing moves toward the rear of the vehicle, thereby allowing the webbing to be automatically applied around himself. In addition, in this seatbelt system, if the occupant is to leave the vehicle, the end portion of the seatbelt moves toward the front of the vehicle to cancel the application of the webbing.

Since there is a possibility of an intermediate portion of the webbing coming into contact with the occupant at the time of application of the webbing or cancellation thereof, a measure has been devised such as to increase the rigidity of an end portion of the webbing so as to separate a portion of the webbing attached to the guide rail from the occupant. However, after the webbing has been positively applied to the occupant, it is necessary to reduce the rigidity of this portion of increased rigidity so as to allow the occupant to secure an optimum webbing-applied position, with the result that such an arrangement disadvantageously becomes complicated.

SUMMARY OF THE INVENTION

In view of the above-described fact, it is a primary object of the present invention to provide an apparatus for driving an intermediate portion of a webbing which is capable of reducing the tension of the webbing by driving the intermediate portion thereof when necessary.

To this end, in accordance with the present invention, there is provided an apparatus for driving an intermediate portion of a webbing, comprising a driving means interposed between a webbing accommodating section and a portion of application of the webbing by an occupant and adapted to drive the webbing in the direction of application of the webbing around the occupant; and a driving source for imparting a webbing-driving force to said driving means.

Accordingly, the apparatus of the present invention, if applied to an automatic seatbelt system, is capable of reducing the webbing tension temporarily by moving an intermediate portion of the webbing in the direction of application of the webbing around the occupant only during the movement of the webbing for application thereof or cancellation of the same. Hence, the webbing with its tension thus reduced fails to interfere with the occupant, with the result that the occupant is capable of assuming a pleasant webbing-applied state or an application-canceled state. In addition, after the occupant has applied the webbing to himself or canceled the application thereof, it is possible to cancel the driving force of the driving means and have the winding-up force of a retractor to act on the webbing, thereby allowing the occupant to assume a suitable webbing-applied state as, in the case of a normal seatbelt system.

It should be noted that, in addition to its use in an automatic seatbelt system, the present invention may be applied to other types of seatbelt system such as an apparatus which facilitates application of a webbing around an occupant by pushing out a portion of the webbing toward him during application of the same (i.e., a belt reacher), whereby the belt tension can be reduced, when necessary.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

Figure 2:
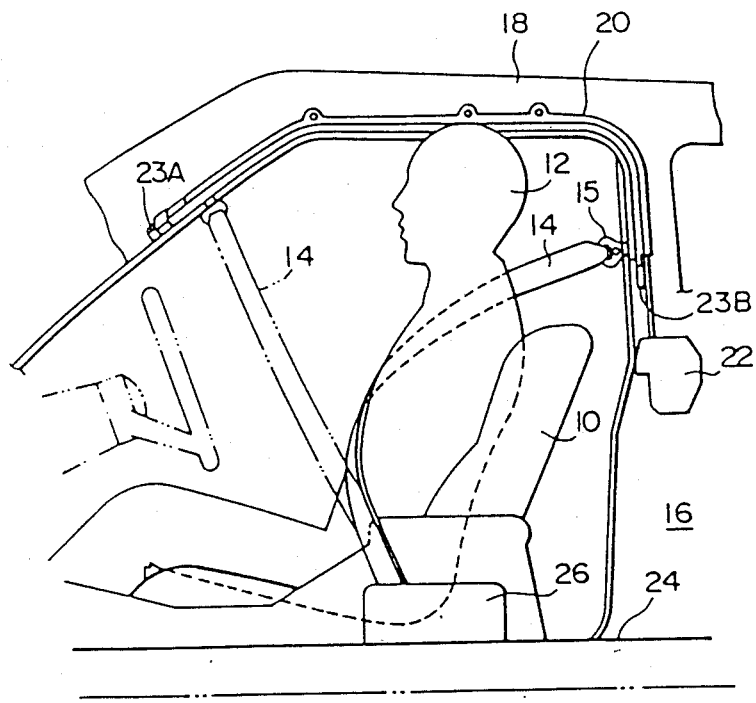
FIG. 2 is a side elevational view of an automatic seatbelt system to which the present invention is applied.

Referring first to FIG. 2, there is shown an arrangement in which the present invention is applied to an automatic seatbelt system. This automatic seatbelt system is arranged such that a webbing 14 can be automatically applied around an occupant 12 seating himself in a seat 10. An anchor plate 15 is fixed to one end of the webbing 14. This anchor plate 15 is guided by a guide rail 20 disposed along a roof side 18 of a vehicle body 16 in the longitudinal direction of the vehicle and is thereby movable in the longitudinal direction of the vehicle.

This anchor plate 15 is moved in the longitudinal direction of the vehicle by means of a belt actuating device 22 installed on the guide rail 20. Specifically, the anchor plate 15 is arranged such that, when the anchor plate 15 is moved toward the front of the vehicle, the anchor plate 15 moves the webbing 14 away from the occupant 12, while, when it is moved toward, the rear of the vehicle, the anchor plate 15 is capable of automatically allowing the webbing 14 to be applied around the occupant 12. The arrangement of this belt actuating device 22 has already been disclosed by an earlier application filed by the present applicant (Japanese Utility Model Laid-Open No. 28552/1980).

Figure 5:
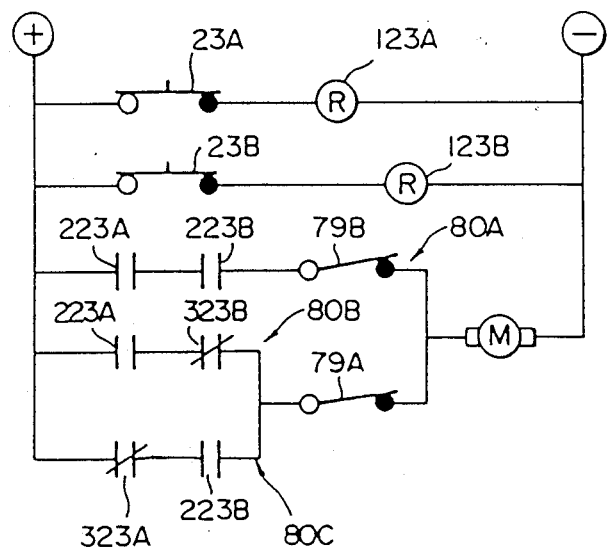
FIG. 5 is a circuit diagram of the first embodiment.

Incidentally, as shown in FIG. 2, this anchor plate 15 is adapted to open a limit switch 23A (normally closed) in a state in which the anchor plate 15 is moved by a maximum amount along the guide rail 20 toward the front of the vehicle, and to open a limit switch 23B (normally closed) in a state in which it is moved by a maximum amount toward the rear of the vehicle. As shown in FIG. 5, these limit switches 23A, 23B respectively actuate relays 123A, 123B. The relay 123A, when in the ON state, closes a contact 223A and opens 323A, and, when in the OFF state, opens the contact 223A and closes the contact 323A. Meanwhile, the relay 123B, when in the ON state, closes a contact 223B and opens a contact 323B, and, when in the OFF state, opens the contact 223B and closes the contact 323B.

A retractor 26 which serves as a webbing accommodating device is installed on a floor 24 in the substantially central portion of the vehicle on the side thereof opposing the roof 18 via a seat 10, and is adapted to wind up and accommodate the other end of the webbing 14.

Figure 1:
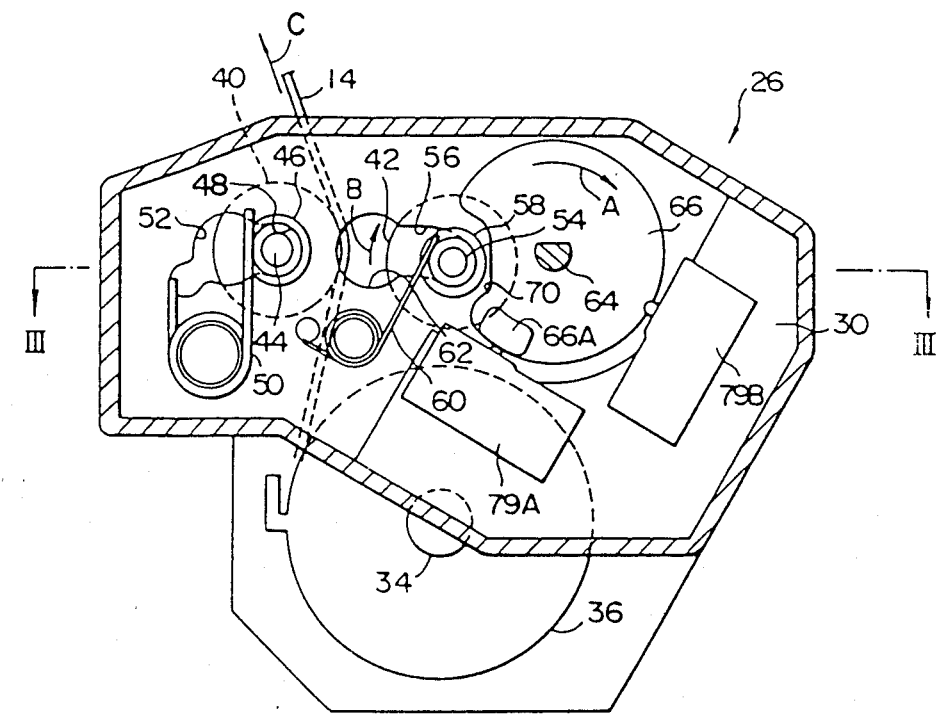
FIG. 1 is a cross-sectional view taken along the line I—I of FIG. 3 showing a first embodiment in accordance with the present invention.
Figure 3:
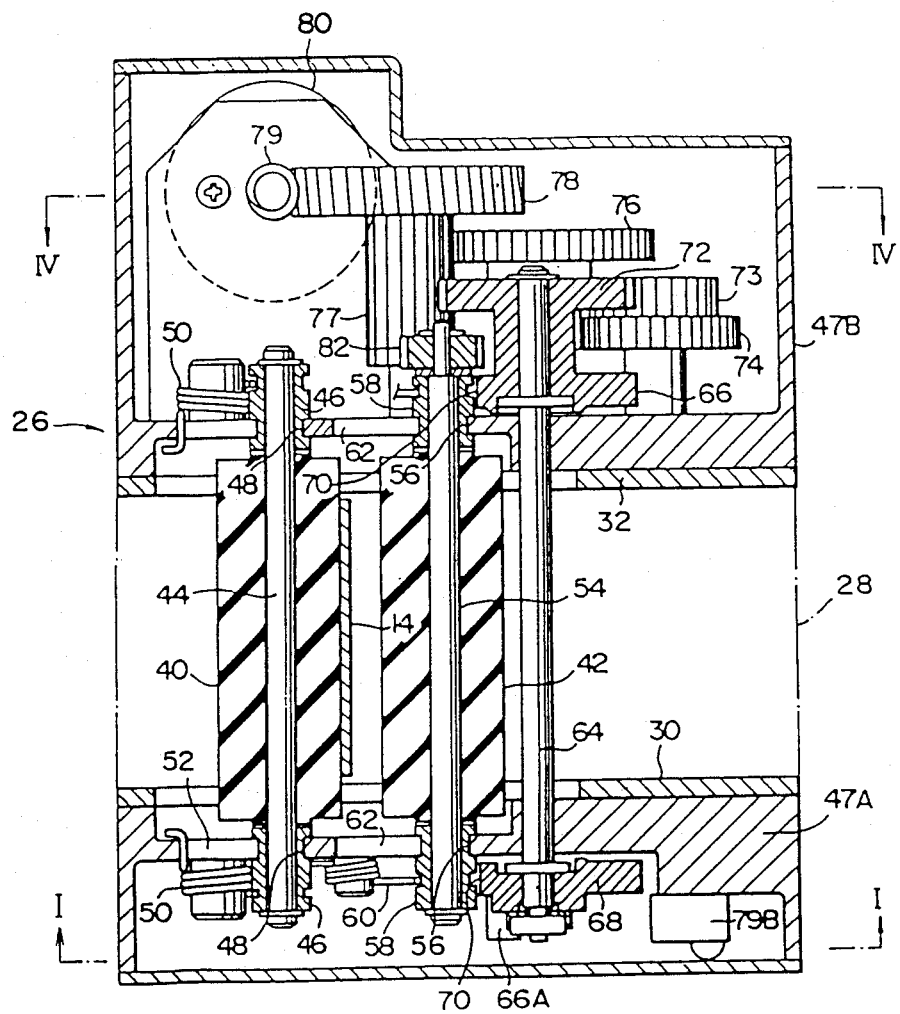
FIG. 3 is a cross-sectional view taken along the line III—III of FIG. 1.

In this retractor 26, as shown in FIGS. 1 and 3, a pair of side plates 30, 32 project form both sides of a base plate 28 to pivotally support a takeup shaft 34. The end portion of the webbing 14 is wound up around this takeup shaft 34 in the form of layers. and this retractor is similar to a general retractor in that the webbing 14 is taken up by the winding force of a coil spring 36.

A clamp roller 40, i.e., a driven roller, and a drive roller 42 are respectively disposed on the side plates 30, 32 such as to clamp the intermediate portion of the webbing 14.

As shown in FIG. 3, the clamp roller 40 has a journal 44 penetrating the same in a concentric manner, and the journal 44 penetrates the side plates 30, 32. Neck portions of sleeves 46, which pivotally support opposite end portions of the journal 44, are pivotally supported by housings 47A, 47B, respectively. The housings 47A, 47B are secured to the side plates 30, 32, respectively. In addition, each of the sleeves 46 is biased toward one side of a pivotally supporting hole 48, i.e., toward the moving path of the webbing 14, by means of a biasing force of a torsional coil spring 50.

Each of the pivotally supporting holes 48 has a portion thereof commonly formed with a round hole 52 of a large diameter which is formed in, the side plate 30, 32, on the opposite side of the webbing 14 via the pivotally supporting hole 48. This round hole 52 is for the insertion of the sleeve 46 at the time of assembly thereof, and facilitates installation of the sleeve 46 and the clamp roller 40.

Meanwhile, the drive roller 42 is disposed such as to be parallel with the clamp roller 40, and its journal 54 projects in an integral manner and penetrates pivotally supporting holes 56 of the housings 47A, 47B. The journal 54 is pivotally supported by sleeves 58 similar to the sleeves 46 at opposite ends thereof. The neck portion of this sleeve 58 is inserted into a pivotally supporting hole 56 to restrict axial movement thereof.

In addition, this journal 54 is biased in the direction of departing from the clamp roller 40 by means of a biasing force of a torsional coil spring 60.

However, since the moving stroke of this journal 54 is designed to be greater than that of the journal 44, the pivotally supporting hole 56 is made to have an oblong shape extending in the direction of the webbing 14. A round hole 62 similar to the round hole 52 is formed at the tip portion thereof.

A rotary shaft 64 is pivotally supported by the housings 47A, 47B. Cams 66, 68 secured to this rotary shaft 64 correspond to the sleeves 58 of the journal 54, respectively, and are adapted to guide the journal 54 and drive roller 42 along the pivotally supporting hole 56 and to clamp and drive the intermediate portion of the webbing 14 between the drive roller 42 and the clamp roller 40.

As shown in details in FIGS. 1 and 3, a recess 70 is formed on a portion of the outer periphery of each of the cams 66, 68, said recess 70 having a depth gradually declining as it approaches the circumferential direction of each of the cams 66, 68.

Figure 4:
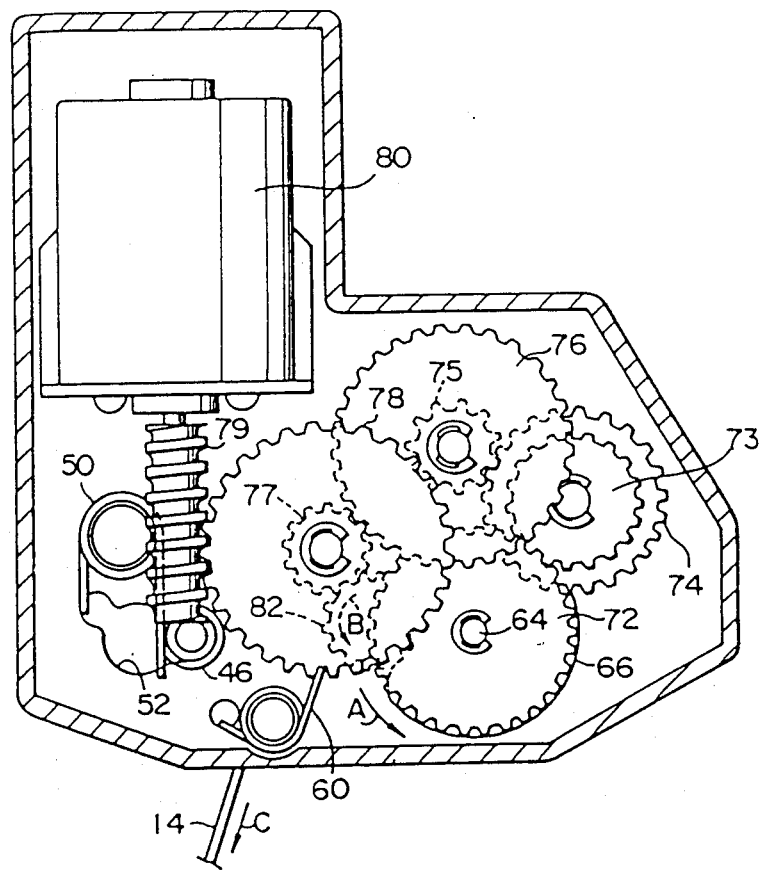
FIG. 4 is a cross-sectional view taken along the line IV—IV of FIG. 3.

A gear 72 secured to the rotary shaft 64 meshes with a worm gear 79 via intermediate gears 73, 74, 75, 76, 77, and 78. This worm gear 79 is secured to an output shaft of a motor 80 which is secured to the housing 47B and is driving source which rotates in one direction. Consequently, the rotation of the motor 80 is transmitted to the cams 66, 68 as the speed is reduced by the respective intermediate gears. Thus the cams 66, 68 are driven in the direction of the arrow A shown in FIGS. 1 and 4 at low speed when the motor 80 rotates. Accordingly, the drive roller 42 approaches the clamp roller 40 along the axially supporting hole 56 so as to clamp the intermediate portion of the webbing 14.

In this case, the drive roller 42 is adapted to move further by a slight amount after clamping the webbing 14 with the clamp roller 40 so as to, absorb a dimensional tolerance. This excessive amount of movement becomes the movement of the journal 44 inside the axially supporting hole 48.

The rotational angle of the cam 66 is adapted to be detected by limit switches 79A, 79B fixed to the side plate 30.

These limit switches 79A, 79B are of the normally closed type, and, when a cam projection 66A provided on the cam 66 comes into contact with them, the limit switches 79A, 79B are adapted to stop the motor 80, as shown in FIG. 5. Accordingly, the motor 80 is capable of stopping in the state of FIG. 1 in which the webbing 14 is not clamped since the recess 70 of the cam 66 is in contact with the sleeve 58 and in the state in which the webbing 14 is being fed while being clamped by the rollers 40, 42.

A gear 82 is secured to an end portion of the journal 54 of the drive roller 42, as shown in FIG. 3. This gear 82 meshes with the intermediate gear 77. Consequently, the journal 54 is rotated in the direction of the arrow B when the motor 80 rotates, thereby allowing the intermediate portion of the webbing 14 to be fed with the webbing 14 being clamped by the drive roller 42 and the clamp roller 40 in the direction of the application of the webbing around the occupant (in the direction of the arrow C).

The axially supporting hole 56 is formed in the shape of a circular arc in which its longitudinal axis is concentric with that of the intermediate gear 77 so that, even in cases where the journal 54 moves within the axially supporting hole 56, the gear 82 will be able to positively maintain the state of meshing with the intermediate gear 77.

Incidentally, $\oplus$ and $\ominus$ and shown in FIG. 5 indicates a power source of the vehicle.

Description will now be made of the operation of the present embodiment.

Before the occupant 12 is seated, the anchor plate 15 has been moved to the front end portion of the guide rail 20 as viewed in the longitudinal direction of the vehicle, and the webbing 14 stretches between the anchor plate 15 and the sheet 10 to form a space for accommodating the passenger.

In this state, the limit switch 23A shown in FIG. 5 is open since the anchor plate 15 is in contact with it, while the limit switch 23B is closed. In addition, the limit switch 79A is open since the cam projection 66A is in contact with the same. Accordingly, a circuit 80A constituted by the contacts 223A, 223B and the limit switch 79B, a circuit 80B constituted by the contacts 223A, 223 and the limit switch 79A, and a circuit 80C constituted by the contacts 223A, 323B and the limit, switch 79A are respectively open, so that the motor 80 does not rotate.

After the occupant is seated on the seat 10, if, for instance, the door is closed, the belt actuating device 22 is operated, the anchor plate 15 moves toward the rear of the vehicle along the guide rail 20, so that it is possible to have the webbing 14 automatically applied around the occupant 12.

In addition, when leaving the vehicle, if the occupant 12 opens the door, the belt actuating device 22 conversely moves the anchor plate 15 along the guide rail 20 toward the front of the vehicle, so that the application of the webbing 14 around the applicant 12 can be automatically canceled.

At the time when the webbing 14 is moved in the longitudinal direction of the vehicle, if the anchor plate 15 is released from the limit switches 23A, 23B, both of these limit switches are closed. Accordingly, the circuit 80A assumes the ON state, so that the motor 80 is actuated, and the webbing in the vicinity of the anchor plate 15 is pushed out in the direction of the anchor plate 15 by the retractor 26. Therefore, the tension of the webbing applied diagonally around the occupant 12 declines, with the result that interference between the webbing 14 in the vicinity of the anchor plate 15 and the occupant 12 can be avoided.

To describe this operation in greater detail, in cases where the occupant cancels the application of the webbing 14, i.e., if the anchor plate 15 is driven toward the front of the vehicle from the state shown by solid lines in FIG. 2, both of the limit switches 23A, 23B are closed. Consequently, the circuit 80A becomes ON and the motor 80 rotates, which in turn rotates the cams 66, 68 in the direction of the arrow A via the intermediate gears 73-78. As a result, the recess 70 immediately rotates up to a position which does not correspond with the sleeve 58, so that the outer peripheral portions of the cams 66, 68 other than the recesses 70 push the sleeve 58, causing the drive roller 42 to clamp the webbing 14 together with the clamp roller 40. Simultaneously, since the gear 82 which is rotated by the intermediate gear 77 rotates the drive roller 42 in the direction of the arrow B, the webbing 14 is forcefully fed in the direction of the arrow C, i.e., in the direction of the portion where the webbing is applied around the occupant. When this feeding is completed, the projection 66A of the cam 66 opens the limits switch 79B, so that the circuit 80A is set to off to stop the rotation of the motor 80. Thus, the webbing is held temporarily in the state in which it is fed out, i.e., in the state in which the tension of the portion of the webbing applied around the occupant is reduced.

When the intermediate portion of the webbing 14 passes the side of the occupant 12 and moves toward the front of the vehicle by a maximum amount, the anchor plate 15 opens the limit switch 23A. Consequently, the circuit 80C is turned ON, and the motor 80 further rotates. Then, when the recess 70 comes into contact with the sleeve 58, the limit switch 79A opens, which sets the circuit 80C to OFF, thereby stopping the motor 80. Since the drive roller 42 consequently separates from the clamp roller 40, a restraining force fails to act on the intermediate portion of the webbing 14. Hence, the webbing 14 is pulled out and moves as the anchor plate 15 moves toward the front of the vehicle.

Accordingly, when the webbing 14 passes the side of the occupant 12, the webbing 14 does not come into contact with the shoulder, neck, or other portions of the occupant 12.

It should be noted that, also when the webbing 14 moves in the direction of application around the occupant 12, i.e., in a case where the anchor plate 15 moves toward the rear of the vehicle, by effecting the same operation as that described above when the webbing 14 passes adjacent to the occupant 12, it becomes possible to prevent interference between the intermediate portion of the webbing 14 and the occupant 12.

In this case, however, the circuit 80A operates in the initial state of movement of the anchor plate 15, and the circuit 80B operates when the anchor plate 15 has moved by a maximum amount toward the rear of the vehicle. Nevertheless, the operation of the cam 66 is the same.

Figure 6:
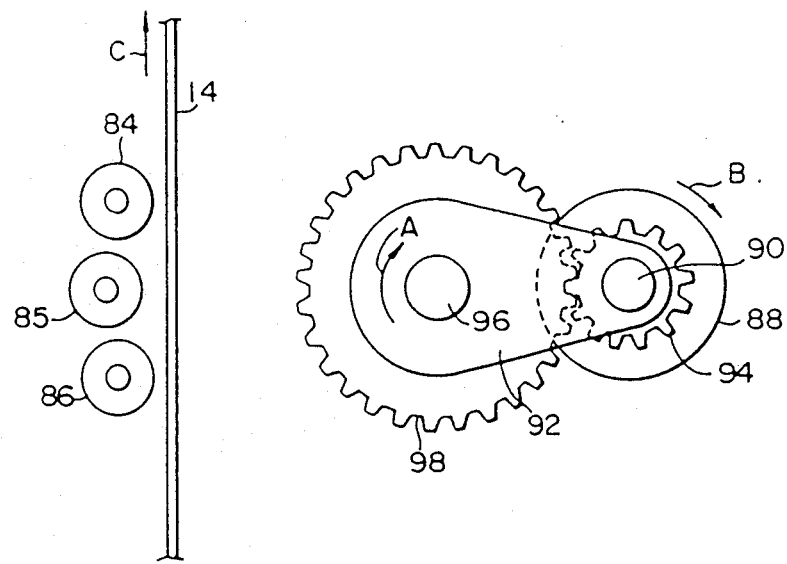
FIG. 6 is a front elevational view corresponding to FIG. 1 and showing a second embodiment in accordance with the present invention.
Figure 7:
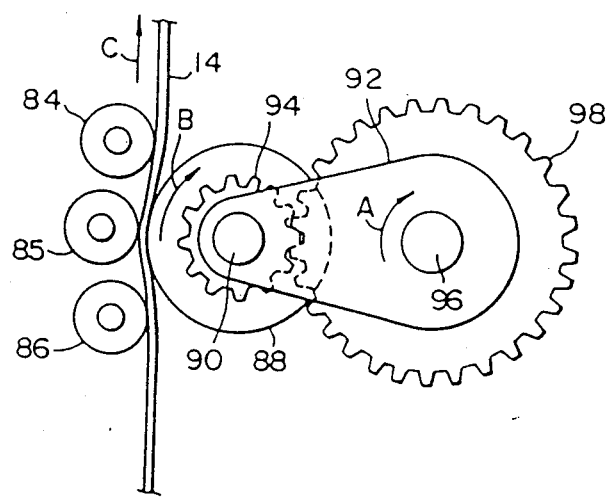
FIG. 7 is an operational view of FIG. 5.

FIGS. 6 and 7 show a second embodiment in accordance with the present invention.

In this embodiment, three clamp rollers 84, 85, and 86 are disposed on one side of the intermediate portion of the webbing 14, while a drive roller 88 is disposed on the other side. A journal 90 to which the drive roller 88 is integrally secured is pivotally supported in the vicinity of the tip portion of an arm 92. A gear 94 is secured integrally to the journal 90, said gear 94 meshing with a gear 98 secured to a fixed shaft 96 which defines the rotational center of the arm 92.

The arm 92 is adapted to be rotated in the direction of the arrow A around the fixed shaft 96 by a motor (not shown), i.e., a driving source. Consequently, the gear 94 revolves (in the direction of the arrow A) round the gear 98 and turns round (in the direction of the arrow B). As shown in FIG. 7, when this arm 92 rotates, the drive roller 88 is adapted to feed the webbing 14 in the longitudinal direction (in the direction of the arrow C) while clamping the intermediate portion of the webbing 14 with the clamp rollers 84, 85, and 86.

For this reason, the axes of the clamp rollers 84, 85, and 86 are disposed on an arc using the fixed shaft 96 as its axis, thereby allowing the drive roller 88 to clamp the intermediate portion of the webbing 14 with the clamp rollers 84, 85, and 86.

It is also possible to provided an arrangement in which the clamp rollers 84 to 86 are made movable by a slight amount in the radial direction as in the case of the above-described embodiment so s to positively ensure the clamping of the webbing 14.

Figure 8:
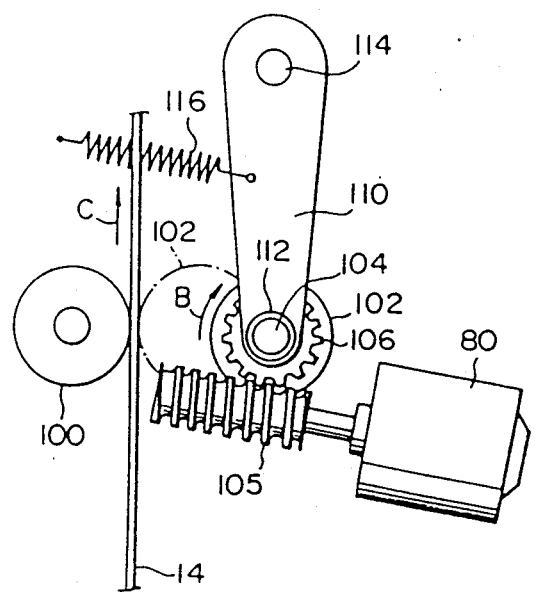
FIGS. 8–11 are front elevational views corresponding to FIG. 6 and showing third to sixth embodiments in accordance with the present invention, respectively.

FIG. 8 shows a third embodiment of the present invention.

In this embodiment, one clamp roller 100 and a drive roller 102 are disposed. A worm wheel 106 is fixed to a journal 104 to which the drive roller 102 is fixed integrally. This worm wheel 106 meshes with a worm gear 105 secured to the output shaft of the motor 80. The journal 104 is pivotally supported by the tip portion of the arm 110 via a one-way clutch 112, and is rotatable only in the direction of the feeding of the webbing 14 (the direction of the arrow B). The arm 110 is pivotally supported around a fixed shaft 114, and a tensile coil spring 116 is trained therewith to bias the same in the direction of the clamp roller 100.

In this embodiment, if the drive roller 102 is rotated in the direction of the arrow B via the worm gear 105 and the worm wheel 106 when the motor 80 rotates, the drive roller 102 approaches the clamp roller 100 by means of the tensile force of the tensile coil spring 116, and feeds out the webbing 14 while clamping the intermediate portion of the webbing 14.

When the motor 80 is rotated reversely, since the drive roller 102 cannot be rotated in the direction opposite to the direction of the arrow B due to the action of the one-way clutch 112, the worm wheel 106 moves in the direction of separating the drive roller 102 from the clamp roller 100, thereby making it possible to cancel the clamping of the webbing 14. In order to positively maintain engagement between the worm gear 105 and the worm wheel 106 despite the arcuate movement of the arm 110, it suffices to increase the height of the teeth of the worm gear 105 and the worm wheel 106 or increase the length of the arm 110.

Figure 9:
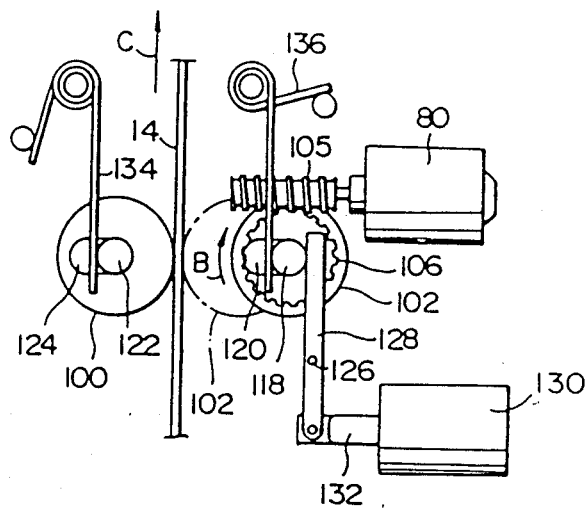

FIG. 9 shows a fourth embodiment of the present invention. In this embodiment, unlike the foregoing embodiments, the drive roller 102 is arranged such that its journal 108 moves along an elongated hole 120 provided in a frame (not shown) so as to be able to come into contact with and separate from the clamp roller 100. The clamp roller 100 is also arranged such that its journal 122 is capable of coming into contact with and separating from the drive roller 102 along an elongated hole 124. In addition, a one-way clutch such as the one employed in the preceding embodiment is not provided, and the rotational force of the worm gear 105 is transmitted to the drive roller 102 via the worm wheel 106, so that the drive roller 102 can always be rotated both forwardly and reversely.

The journal 118 corresponds with one end portion of an arm 128 whose intermediate portion is pivotally supported by the frame by means of a shaft 126, while the other end portion of the arm 128 is coupled with an actuator 132 of a solenoid 130.

Hence, the arrangement is such that, if the solenoid 130 is actuated and the motor 80 is driven, the drive roller 102 rotates in the direction of the arrow B through the rotation of the arm 128, and the journal 118 moves along the elongated hole 120, while the journal 118 moves along the elongated hole 120 to feed out the webbing 14 in the direction of the arrow C while the intermediate portion of the webbing 14 is being clamped between the drive roller 102 and the clamp roller 100.

The clamp roller 100 is biased in the direction of the drive roller 102 by means of the biasing force of a torsional coil spring 134, while,the drive roller 102 is biased in the direction of separating from the clamp roller 100 by means of the biasing force of a torsional coil spring 136.

Figure 10:
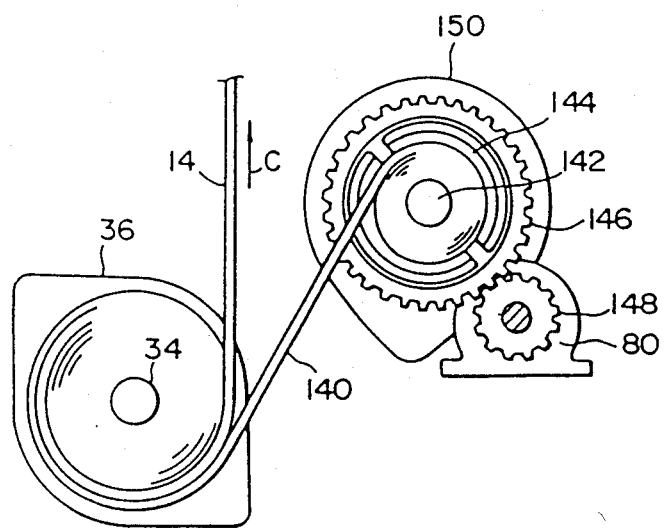

FIG. 10 shows a fifth embodiment of the present invention.

In this embodiment, the webbing 14 and an auxiliary belt 140 are wound up around a takeup shaft 34 in such a manner that the end portion of the auxiliary belt 140 is superposed on the end portion of the webbing 14. The other end portion of this auxiliary belt 140 paid out is taken up in layers by a shaft 142 pivotally supported by the frame. Consequently, the arrangement is such that if the shaft 142 winds up the auxiliary belt 140, the webbing 14 is pulled out from the takeup shaft 34 together with the auxiliary belt 140, making it possible to impart a driving force to the webbing 14 in the longitudinal direction thereof in the direction of the arrow C.

Accordingly, the auxiliary belt 140 is coupled with a gear 146 via a centrifugal clutch 144, and a gear meshing with the gear 146 is coupled with the output shaft of the motor 80.

In consequence, at the time when the motor 80 rotates, the gear 146 is rotated via the gear 148, and the centrifugal clutch 144 is engaged with the gear 148, so that the shaft 142 winds up the auxiliary belt 140. Thus the intermediate portion of the webbing 14 is paid out in the direction of the webbing-applied portion of the occupant (in the direction of the arrow C).

It should be noted that a flat spiral spring wind-up means 150 is provided at an axial end portion of the shaft 142 to wind up the auxiliary belt 140 with a weak biasing force. The winding force of this flat spiral spring wind-up means 150 is adapted to be weaker than that of a winding flat spiral spring 36 of the takeup shaft 34, thereby allowing the webbing 14 to move at the time of cancellation of application. In other words, in cases where the webbing 14 is automatically applied, if the remaining webbing 14 is wound up around the takeup shaft 34, the withdrawal of the auxiliary belt 140 from the shaft 142 is made possible by virtue of the biasing force of the flat spiral spring 36. Conversely, if the webbing 14 is withdrawn from the takeup shaft 34 at the time of cancellation of application, the auxiliary belt 140 which is simultaneously pulled out by the withdrawing action of the webbing 14 is positively wound up by the shaft 142.

Figure 11:
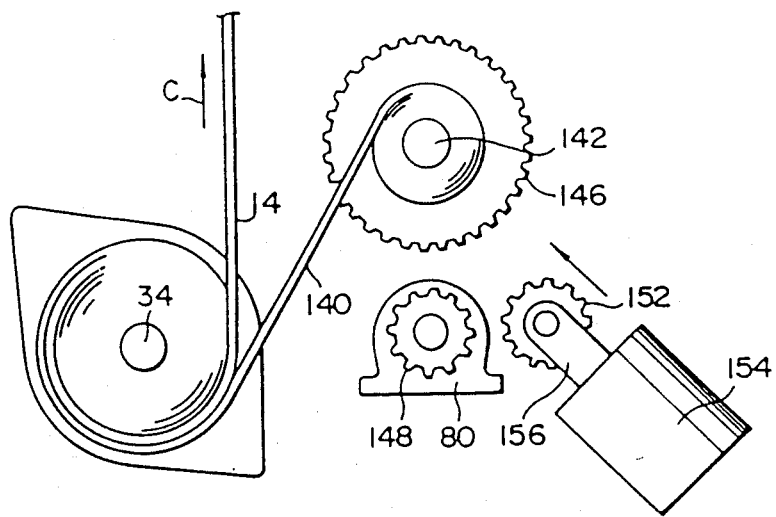

FIG. 11 shows a sixth embodiment of the present invention. In this embodiment, the arrangement is as follows: Using the auxiliary belt 140 which is wound up around the takeup shaft 34 together with the webbing 14, as in the case of the foregoing fifth embodiment, the webbing 14 is withdrawn from the takeup shaft 34 by winding up the auxiliary belt 140 around the shaft 142.

In this embodiment, the centrifugal clutch 144 used in the preceding embodiment is not employed, and the gear 146 is secured directly to the shaft 142, and the gear 148 is pivotally supported away from the gear 146. An intermediate gear 152 is interposed between the gears 146 and 148. A driving force of the motor 80 is transmitted to the gear 148.

This intermediate gear 152 is pivotally supported by the tip portion of an actuator 156 which is driven by a solenoid 154.

Consequently, if the solenoid 154 is actuated, the actuator 156 projects from the solenoid 154, and the intermediate gear 152 enters between the gears 146 and 148 to engage with the two gears 146, 148.

Accordingly, since the rotation of the motor 80 is transmitted to the shaft 142 via the gears 148, 152, and 146, and the auxiliary belt 140 is wound up around the shaft 142, the webbing 14 is withdrawn.

In cases where it is unnecessary to keep the tension of the webbing 14 reduced, if the solenoid pulls in the actuator 156, the intermediate gear 152 is disengaged with the motor 80. Also, it is possible to provide a means for winding up the auxiliary webbing 140 with weak tension, as in the case of the preceding embodiment.

The present invention should not be restricted to each of the above-described arrangements, and can be applied to any driving apparatus in which a drive roller is capable of feeding an intermediate portion of a webbing to a portion of application of the webbing around the occupant.

What is claimed is:

1. An apparatus for driving an intermediate portion of a webbing, comprising:
    driving means interposed between a webbing accommodating section and a portion of application of the webbing onto an occupant and adapted to drive the webbing in the direction of application of the webbing around the occupant; and
    a driving source for imparting a webbing-driving force to said driving means.

2. An apparatus for driving an intermediate portion of a webbing according to claim 1, wherein said driving means includes a clamp roller and a drive roller adapted to clamp the intermediate portion of the webbing with said clamp roller and driven by said driving source to drive the webbing in the direction of application of the webbing around the occupant.

3. An apparatus for driving an intermediate portion of a webbing according to claim 2, further, comprising moving means for moving said drive roller in the direction of clamping the webbing with said clamp roller.

4. An apparatus for driving an intermediate portion of a webbing according to claim 3, wherein said moving means includes cam means driven by said driving source and adapted to move said drive roller in the direction of the webbing.

5. An apparatus for driving an intermediate portion of a webbing according to claim 3, wherein said moving means comprises arm means in which said drive roller is pivotally supported by a first portion thereof, and which is rotated with a second portion thereof as a center to allow said drive roller to clamp the webbing with said clamp roller.

6. An apparatus for driving an intermediate portion of a webbing according to claim 3, wherein said moving means includes a solenoid and an actuator for moving said drive roller by means of the operation of said actuator in the direction of clamping the webbing with said clamp roller.

7. An apparatus for driving an intermediate portion of a webbing according to claim 1, wherein said webbing accommodating section is wound up by a retractor supported by a vehicle body, said driving means including an auxiliary belt wound up by said retractor by being superposed on the webbing, and winding-off means for winding off said auxiliary belt from said retractor.

8. An apparatus for driving an intermediate portion of a webbing according to claim 7, wherein said winding-off means includes a first shaft for winding up said auxiliary belt in the form of layers, and said driving source includes a motor for rotating said first axis to allow said auxiliary belt to be wound up therearound.

9. An apparatus for driving an intermediate portion of a webbing for use in an seatbelt system for restraining an occupant of a vehicle by means of a webbing, comprising:
    driving means for withdrawing the webbing from a webbing accommodating device supported by a vehicle body and accommodating the webbing by means of a biasing force in opposition to the biasing force thereof; and
    a driving source for driving said driving means.

10. An apparatus for driving an intermediate portion of a webbing according to claim 9, wherein said driving means includes a clamp roller and a drive roller adapted to clamp the intermediate portion of the webbing with said clamp roller and driven by said driving source to withdraw the webbing.

11. An apparatus for driving an intermediate portion of a webbing according to claim 10, wherein said moving device includes third biasing means for biasing said drive roller in the direction of said second position, a solenoid, and an actuator for moving said drive roller to said first position on actuation thereof.

12. An apparatus for driving an intermediate portion of a webbing according to claim 10, wherein said accommodating device has a takeup shaft rotated by a biasing force and adapted to take up the webbing, and said driving means has an auxiliary belt a portion of which is taken up such as to 13. An apparatus for driving an intermediate portion of a webbing according to claim 9, further comprising moving means for moving said drive roller to a first position of clamping the webbing together with said clamp roller and to a second position for canceling the clamping of the webbing.

14. An apparatus for driving an intermediate portion of a webbing according to claim 13, wherein said moving means includes cam means includes first biasing means for biasing said drive roller in the direction of said second position and cam means driven by said driving source via deceleration means and adapted to move said drive driver roller to said first position in opposition to a biasing force of said biasing means.

15. An apparatus for driving an intermediate portion of a webbing according to claim 14, wherein said clamp roller is biased by second biasing means in the direction of clamping the webbing together with said drive roller.

16. An apparatus for driving an intermediate portion of a webbing according to claim 13, wherein said moving means includes an arm at a first position of which said drive roller is pivotally supported and which is rotated with a second portion thereof as a center so as to move said drive roller between said first position and said second position. be superposed on the webbing and winding-off means for winding off said auxiliary belt from said takeup shaft.

17. An apparatus for driving an intermediate portion of a webbing for use in a seatbelt system having a webbing, one end portion of which is taken up around a takeup shaft by a biasing force, the other end portion of which is retained by a vehicle body, and an intermediate portion of which restrains an occupant, comprising:
    driving means for winding off the webbing from said takeup shaft in opposition of to biasing force; and
    a driving source for driving said driving means.

18. An apparatus for driving an intermediate portion of a webbing according to claim 17, wherein said driving source includes a motor, and said driving means includes a drive roller rotated in the direction of the winding off of the webbing during the forward rotation of said motor and a clamp roller for paying off the webbing by clamping the intermediate portion of the webbing together with said drive roller.

19. An apparatus for driving an intermediate portion of a webbing according to claim 18, further comprising moving means for moving said drive roller to a first position for clamping the webbing together with said drive roller and to a second position for canceling the clamping of the webbing.

20. An apparatus for driving an intermediate portion of a webbing according to claim 19, further comprising a cam driven by said motor via reducing means during forward rotation of said motor and adapted to move said drive roller to said first position, and a first spring for biasing said drive roller to said second position.

21. An apparatus for driving an intermediate portion of a webbing according to claim 20, further comprising a second spring for biasing said clamp roller in the direction of clamping the webbing.

22. An apparatus for driving an intermediate portion of a webbing according to claim 19, wherein said moving means includes an arm having a first portion for pivotally supporting said drive roller and a second portion serving as a center of rotation thereof by the forward rotation of said motor, thereby consecutively moving said drive roller to said first and second positions.

23. An apparatus for driving an intermediate portion of a webbing according to claim 19, wherein, a first gear which is rotated integrally with said drive roller is supported by said first portion concentrically with said drive roller, and an immovable second gear engaging with said first gear is supported by said second portion, whereby said first gear is rotated in correspondence with the rotation of said arm.

24. An apparatus for driving an intermediate portion of a webbing according to claim 19, wherein said moving means includes an arm having a first portion for pivotally supporting said drive roller and a second portion which is pivoted, a worm wheel supported by said first portion concentrically with said drive roller and rotated integrally with said drive roller during the forward rotation of said motor, a worm rotated by said motor in engagement with said worm wheel, and a third spring for biasing said arm in the direction of said first position.

25. An apparatus for driving an intermediate portion of a webbing according to claim 19, wherein said moving means further includes a fourth spring for biasing said drive roller in the direction of said second position, a solenoid, an actuator for moving said drive roller to said first position on actuation of said solenoid in opposition to the biasing force of said forth spring.

26. An apparatus for driving an intermediate portion of a webbing according to claim 17, wherein said driving means has an auxiliary belt taken up around said takeup shaft such as to be superposed on the webbing and winding off means for winding off said auxiliary belt from said takeup shaft.

27. An apparatus for driving an intermediate portion of a webbing according to claim 26, wherein said driving source is a motor, and said winding-off means includes a shaft rotated by said motor.

28. An apparatus for driving an intermediate portion of a webbing according to claim 17, wherein said seatbelt system is an automatic seatbelt system in which said webbing is capable of automatically applied around the occupant after the occupant has entered the vehicle.

29. An apparatus for driving an intermediate portion of a webbing according to claim 28, wherein the other end portion of said webbing is guided along a rail laid along a side of the vehicle.

* * * * *